UNITED STATES PATENT OFFICE.

HEINRICH OSTERMANN AND CHARLES LACROIX, OF GENEVA, SWITZERLAND, ASSIGNORS TO THE USINE GENEVOISE DE DEGROSSISSAGE D'OR, OF SAME PLACE.

METALLIC ALLOY.

SPECIFICATION forming part of Letters Patent No. 381,719, dated April 24, 1888.

Application filed February 16, 1888. Serial No. 264,300. (No specimens.)

*To all whom it may concern:*

Be it known that we, HEINRICH OSTERMANN, chemist, and CHARLES LACROIX, director of the firm Usine Genevoise de Degrossisage d'Or, both residing at Geneva, Switzerland, have invented a Metallic Alloy, of which the following is a specification.

Our invention consists of a new alloy composed of metals uninfluenced by magnetism and inoxidizable, and essentially intended to be used for manufacturing those parts of watches which are generally made of steel and which are liable to alter the good acting of watches, chronometers, and other time-pieces if they get magnetized or oxidized. Our metallic alloy answers that purpose in a remarkable manner, and it has the same hardness and elasticity as steel.

The composition of our alloy is as follows: gold, palladium, copper, silver, wolfram, and cobalt. Those metals are suitably combined together in the following proportions: gold, thirty to forty parts; palladium, twenty-five to forty parts; copper, thirty to forty parts; palladium, thirty to forty parts; copper, thirty to forty parts; one-tenth of one part to one part; ——rt to five parts; and cobalt, —and a half parts.

The wolfram is first melted with the c——and this combination of metals is ther—with the suitable quantities of gold, p—cobalt, and silver.

Having thus described our in—claim—

1. An alloy composed of gold, copper, silver, wolfram, and —purpose specified.

2. An alloy composed of g— parts; palladium, twenty— parts; copper, thirty to or—tenth of one part to or—part to five parts; an—part to two and a hal—described, and for t—

In testimony wh—names to this spe—two subscribing —

Witness—
L. —
F—